United States Patent
Nakamura et al.

(10) Patent No.: US 7,990,493 B2
(45) Date of Patent: *Aug. 2, 2011

(54) LAMINATED OPTICAL FILM, POLARIZING PLATE AND LIQUID CRYSTAL DISPLAY DEVICE

(75) Inventors: Shun Nakamura, Minami-Ashigara (JP); Yasuyuki Sasada, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 12/235,037

(22) Filed: Sep. 22, 2008

(65) Prior Publication Data
US 2009/0086129 A1     Apr. 2, 2009

(30) Foreign Application Priority Data
Sep. 28, 2007    (JP) .................................. 2007-256896

(51) Int. Cl.
G02F 1/1335    (2006.01)
G02F 1/13363    (2006.01)
G02B 5/30    (2006.01)

(52) U.S. Cl. ..... 349/96; 349/118; 349/119; 359/489.01; 359/489.07

(58) Field of Classification Search .................. None
See application file for complete search history.

(56) References Cited

U.S. PATENT DOCUMENTS
2009/0086128 A1 * 4/2009 Nakamura et al. .............. 349/96
2009/0086138 A1 * 4/2009 Nakamura et al. ............. 349/119
2009/0091694 A1 * 4/2009 Sasada .......................... 349/117

FOREIGN PATENT DOCUMENTS
JP    2006-039211 A    2/2006
* cited by examiner

*Primary Examiner* — Michelle R Connelly Cushwa
(74) *Attorney, Agent, or Firm* — Buchanan Ingersoll & Rooney PC

(57) ABSTRACT

A laminated optical film including a first optical anisotropic layer, and a second optical anisotropic layer, wherein Relationship (1) is satisfied when a slow phase axis of the first optical anisotropic layer is substantially perpendicular to a slow phase axis of the second optical anisotropic layer, −10 nm≦ΔRe1−ΔRe2≦10 nm    Relationship (1)

wherein Relationship (2) is satisfied when the slow phase axis of the first optical anisotropic layer is substantially parallel to the slow phase axis of the second optical anisotropic layer, and −10 nm≦ΔRe1+ΔRe2≦10 nm    Relationship (2)

wherein an in-plane retardation value Re of the film as a whole satisfies 30 nm≦Re≦500 nm, where ΔRe1 denotes a value calculated from "Re1 (at an RH of 80%)—Re1 (at an RH of 50%)" concerning the first optical anisotropic layer, and ΔRe2 denotes a value calculated from "Re2 (at an RH of 80%)—Re2 (at an RH of 50%)" concerning the second optical anisotropic layer.

8 Claims, 3 Drawing Sheets

LAMINATED OPTICAL FILM, POLARIZING PLATE AND LIQUID CRYSTAL DISPLAY DEVICE

BACKGROUND OF THE INVENTION

1. Field of the Invention

The present invention relates to a laminated optical film, a polarizing plate including the laminated optical film, and a liquid crystal display device using the polarizing plate.

2. Description of the Related Art

Liquid crystal display devices are provided with optical films (phase difference films) having optical anisotropy, for the purpose of enlarging viewing angles, for instance. The transmittance of the liquid crystal display devices can be controlled by adjusting the optical properties (e.g. in-plane retardation values) of these optical films; thus, there are demands for a wider range of optical properties of the optical films.

Accordingly, the range of optical properties of the optical films is widened by lamination of the optical films.

Since optical films of this type are made of transparent polymer films, they are easily affected by humidity. Thus, when the humidity changes, their optical properties may also change. If the optical properties of the optical films change, it is problematic because the display quality of liquid crystal display devices changes as well.

Especially in the case where a plurality of optical films are laid on top of one another, there is a problem that a greater effect is caused by a change in optical property that is due to a change in humidity, as the number of optical films increases.

Also, in recent years, liquid crystal display devices have been used for car navigation systems and display units for vehicles, e.g. instrumental panels, which are strongly required to be durable against changes of use environments such as humidity conditions. Thus, provision of optical films which are durable against humidity change, in particular, is hoped for.

For instance, Japanese Patent Application Laid-Open (JP-A) No. 2006-39211 discloses a technique for reducing change in optical property that is due to dimensional change, by setting dimensional change directions of two phase difference plates at right angles.

Phase difference plates (optical films) of this type possibly change in optical property due to humidity change, even when they do not change in dimension. In such a case, the technique described in JP-A No. 2006-39211 is problematic because it cannot reduce change in optical property.

BRIEF SUMMARY OF THE INVENTION

An object of the present invention is to provide a laminated optical film capable of reducing change in the optical property value of the laminated optical film as a whole, even when the optical property values of its layers change due to a humidity change; a polarizing plate including the laminated optical film; and a liquid crystal display device using the polarizing plate.

Means for solving the above-mentioned problems are as follows.

<1> A laminated optical film including a first optical anisotropic layer, and a second optical anisotropic layer, wherein Relationship (1) is satisfied when a slow phase axis of the first optical anisotropic layer is substantially perpendicular to a slow phase axis of the second optical anisotropic layer, $$-10 \text{ nm} \leq \Delta Re1 - \Delta Re2 \leq 10 \text{ nm} \quad \text{Relationship (1)}$$

wherein Relationship (2) is satisfied when the slow phase axis of the first optical anisotropic layer is substantially parallel to the slow phase axis of the second optical anisotropic layer, and $$-10 \text{ nm} \leq \Delta Re1 + \Delta Re2 \leq 10 \text{ nm} \quad \text{Relationship (2)}$$

wherein an in-plane retardation value Re of the laminated optical film as a whole satisfies 30 nm $\leq$ Re $\leq$ 500 nm, where $\Delta Re1$ denotes a value obtained by calculating the expression Re1 (at a relative humidity of 80%)—Re1 (at a relative humidity of 50%) concerning the first optical anisotropic layer, and $\Delta Re2$ denotes a value obtained by calculating the expression Re2 (at a relative humidity of 80%)—Re2 (at a relative humidity of 50%) concerning the second optical anisotropic layer.

<2> The laminated optical film according to <1>, wherein Rth1 of the first optical anisotropic layer, and Rth2 of the second optical anisotropic layer satisfy one of Relationships (3) and (4), and $$\Delta Rth1 \geq 0 \text{ nm and } \Delta Rth2 \leq 0 \text{ nm} \quad (3)$$

$$\Delta Rth1 < 0 \text{ nm and } \Delta Rth2 > 0 \text{ nm} \quad (4)$$

wherein a retardation value Rth of the laminated optical film as a whole in its thickness direction satisfies 50 nm $\leq$ Rth $\leq$ 500 nm, where $\Delta Rth1$ denotes a value obtained by calculating the expression Rth1 (at a relative humidity of 80%)—Rth1 (at a relative humidity of 50%) concerning the first optical anisotropic layer, and $\Delta Rth2$ denotes a value obtained by calculating the expression Rth2 (at a relative humidity of 80%)—Rth2 (at a relative humidity of 50%) concerning the second optical anisotropic layer.

<3> The laminated optical film according to any one of <1> and <2>, wherein the first optical anisotropic layer and the second optical anisotropic layer are stuck together by roll-to-roll processing when both of them are in the form of rolls.

<4> The laminated optical film according to any one of <1> to <3>, further including a third optical anisotropic layer, wherein the third optical anisotropic layer is formed of a hybrid aligned discotic liquid crystal layer.

<5> The laminated optical film according to <4>, wherein when the third optical anisotropic layer is formed, a rubbing direction is angled by 40° to 50° with respect to the slow phase axis of the first optical anisotropic layer and the slow phase axis of the second optical anisotropic layer.

<6> A polarizing plate including the laminated optical film according to any one of <1> to <5>, and a polarizer.

<7> A liquid crystal display device including the polarizing plate according to <6>, and a liquid crystal cell.

<8> The liquid crystal display device according to <7>, wherein the liquid crystal cell is a liquid crystal cell of OCB mode.

According to the present invention, it is possible to solve problems in related art and provide a laminated optical film capable of reducing change in the optical property value of the laminated optical film as a whole, even when the optical property values of its layers change due to a humidity change; a polarizing plate including the laminated optical film; and a liquid crystal display device using the polarizing plate.

DETAILED DESCRIPTION OF THE INVENTION

Figure 1:
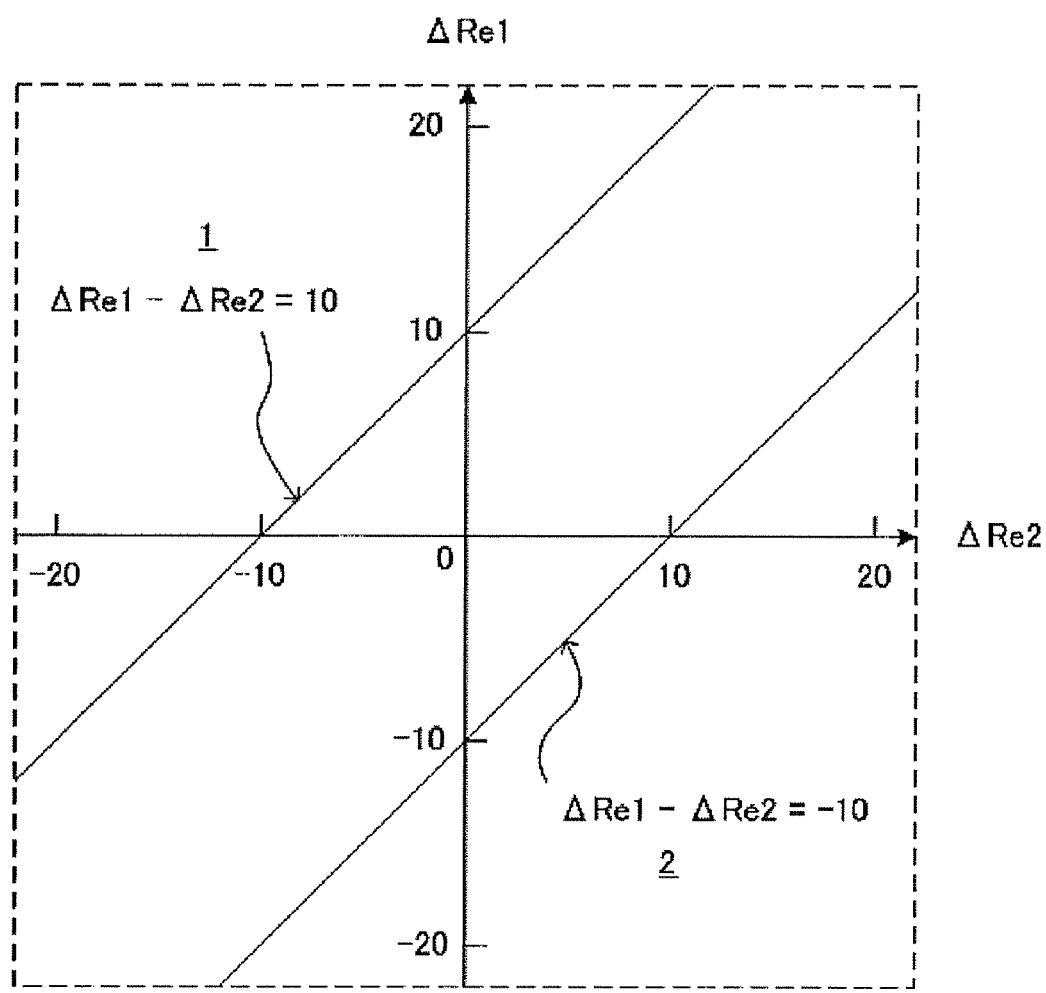
FIG. 1 is a graph showing Relationship (1).

The following explains in detail a laminated optical film, a polarizing plate and a liquid crystal display device of the present invention. In explanations of embodiments of the present invention, note that the terms "parallel", "perpendicular" and "perpendicularly (vertically)" each involve an angular error of less than 5°. The angular error is preferably less than 4°, more preferably less than 3°.

As to angles, the symbol "+" denotes a clockwise direction, and the symbol "−" denotes a counterclockwise direction.

The term "slow phase axis" denotes the direction in which the refractive index has a maximum value. The measurement wavelength concerning the refractive index has a value in the visible light region (λ=550 nm) unless otherwise stated.

In explanations of the embodiments of the present invention, the in-plane retardation value Re (Re1 and Re2) of a measurement target (film) is defined by Equation (I) shown below, and it is measured by making a beam with a wavelength of λ nm enter in the film normal direction, using the phase difference measuring apparatus KOBRA-21ADH or KOBRA-WR (manufactured by Oji Scientific Instruments). In selecting the measurement wavelength (λ nm), a wavelength selective filter may be manually replaced, or the measurement value thereof may be converted in accordance with a program, etc.

$$Re=(nx-ny) \times d \quad \text{Equation (I)}$$

In Equation (I), "nx" and "ny" denote the refractive index in the slow phase axis direction and the refractive index in the advanced phase axis direction respectively, in the plane of the measurement target; "d" denotes the thickness of the measurement target.

In the case where a film to be measured can be represented by a uniaxial or biaxial index ellipsoid, the retardation value Rth in the thickness direction is calculated in accordance with the following method.

Re is measured at six points in total by making a beam with a wavelength of λ nm enter from inclined directions set at different angles as far as 50° on each side at intervals of 10° with respect to the film normal direction, as a slow phase axis (judged by KOBRA-21ADH or KOBRA-WR) in the film plane serves as an inclined axis (rotational axis) (in the case where there is no slow phase axis, an arbitrary direction in the film plane serves as a rotational axis); then Rth is calculated by KOBRA-21ADH or KOBRA-WR, based upon the retardation values measured, an assumed value of the average refractive index, and a film thickness value that has been input.

As to the foregoing, in the case of a film wherein a slow phase axis in the plane serves as a rotational axis and there is a direction in which the retardation value is zero at a certain inclined angle with respect to the film normal direction, the retardation value at an inclined angle greater than the certain inclined angle is given a minus sign, then Rth is calculated by KOBRA-21ADH or KOBRA-WR.

Additionally, with a slow phase axis serving as an inclined axis (rotational axis) (in the case where there is no slow phase axis, an arbitrary direction in the film plane serves as a rotational axis), the retardation values may be measured in relation to two arbitrary inclined directions, then Rth may be calculated from Equations (A) and (II) below, based upon those retardation values, an assumed value of the average refractive index, and a film thickness value that has been input.

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad \text{Equation (A)}$$

In Equation (A), Re(θ) denotes a retardation value in a direction inclined at an angle of θ to the normal direction.

Also in Equation (A), "nx" denotes the refractive index in the slow phase axis direction in the plane, "ny" denotes the refractive index in the direction perpendicular to the direction concerning "nx" in the plane, and "nz" denotes the refractive index in the direction perpendicular to the directions concerning "nx" and "ny".

$$Rth=((nx+ny)/2-nz) \times d \quad \text{Equation (II)}$$

In the case where a film to be measured cannot be represented by a uniaxial or biaxial index ellipsoid, in other words where a film has no optical axis, Rth is calculated in accordance with the following method.

Re is measured at eleven points in total by making a beam with a wavelength of λ nm enter from inclined directions set at different angles ranging from −50° to +50° at intervals of 10° with respect to the film normal direction, as a slow phase axis (judged by KOBRA-21ADH or KOBRA-WR) in the film plane serves as an inclined axis (rotational axis); then Rth is calculated by KOBRA-21ADH or KOBRA-WR, based upon the retardation values measured, an assumed value of the average refractive index, and a film thickness value that has been input.

As to the measurement, the assumed value of the average refractive index may be selected from relevant values mentioned in Polymer Handbook (John Wiley & Sons, Inc) or in catalogues of optical films. If the value of the average refractive index of an optical film is unknown, it can be measured using an Abbe refractometer. The values of the average refractive indices of major optical films are shown below as examples: cellulose acylate (1.48), cycloolefin polymer (1.52), polycarbonate (1.59), polymethyl methacrylate (1.49), polystyrene (1.59). Upon input of the assumed value of the average refractive index and the film thickness value, KOBRA-21ADH or KOBRA-WR calculates nx, ny and nz. Based upon nx, ny and nz that have been calculated, the equation Nz=(nx−nz)/(nx−ny) can be calculated.

[Laminated Optical Film]

The laminated optical film includes, at least, two optical anisotropic layers. In the present invention, one of the optical anisotropic layers is referred to as "first optical anisotropic layer", and the other of the optical anisotropic layers is referred to as "second optical anisotropic layer".

The first optical anisotropic layer and the second optical anisotropic layer each have a slow phase axis in their planes.

Here, the in-plane retardation value of the first optical anisotropic layer is denoted by Re1, and the in-plane retardation value of the second optical anisotropic layer is denoted by Re2.

The in-plane retardation value of the laminated optical film, in which the first and second optical anisotropic layers are laid on top of each other, is denoted by Re.

As to the laminated optical film of the present invention, the in-plane retardation value Re of the laminated optical film as a whole satisfies 30 nm≦Re≦500 nm, and the in-plane retardation value (Re) of the laminated optical film as a whole does not change from an initial property value even when the optical property values (Re1 and Re2) of the optical anisotropic layers change due to a change in humidity conditions.

The retardation value of the first optical anisotropic layer in its thickness direction is denoted by Rth1, and the retardation value of the second optical anisotropic layer in its thickness direction is denoted by Rth2.

The retardation value of the laminated optical film, in which the first and second optical anisotropic layers are laid on top of each other, in its thickness direction is denoted by Rth.

As to the laminated optical film of the present invention, the retardation value Rth of the laminated optical film as a whole in its thickness direction satisfies 50 nm≦Rth≦500 nm, and the retardation value (Rth) of the laminated optical film as a whole in its thickness direction does not change from an initial property value even when the optical property values (Rth1 and Rth2) of the optical anisotropic layers change due to a change in humidity conditions.

The following explains the structure of the laminated optical film of the present invention in a specific manner by giving a first embodiment, a second embodiment and a third embodiment as examples.

First Embodiment

A laminated optical film of a first embodiment includes at least a first optical anisotropic layer and a second optical anisotropic layer, and the first optical anisotropic layer and the second optical anisotropic layer are laid on top of each other such that a slow phase axis in the plane of the first optical anisotropic layer is substantially perpendicular to a slow phase axis in the plane of the second optical anisotropic layer.

When the first optical anisotropic layer and the second optical anisotropic layer are thus laid, a phase difference caused by the first optical anisotropic layer and a phase difference caused by the second optical anisotropic layer offset each other.

Here, Re1 of the first optical anisotropic layer at a relative humidity of 50% is denoted by Re1 (50% RH), and Re1 of the first optical anisotropic layer at a relative humidity of 80% is denoted by Re1 (80% RH).

Likewise, Re2 of the second optical anisotropic layer at a relative humidity of 50% is denoted by Re2 (50% RH), and Re2 of the second optical anisotropic layer at a relative humidity of 80% is denoted by Re2 (80% RH).

The expression Re1 (80% RH)—Re1 (50% RH) is denoted by ΔRe1, and the expression Re2 (80% RH)—Re2 (50% RH) is denoted by ΔRe2.

The first and second optical anisotropic layers whose slow phase axes are placed as described above satisfy Relationship (1) shown below.

$$-10 \text{ nm} \leq \Delta Re1 - \Delta Re2 \leq 10 \text{ nm} \quad \text{Relationship (1)}$$

Here, details of Relationship (1) are explained with reference to FIG. 1. FIG. 1 is a graph showing Relationship (1), in which the vertical axis represents ΔRe1 and the horizontal axis represents ΔRe2.

Relationship (1) corresponds to the area sandwiched between the straight line ΔRe1 −ΔRe2=10 (denoted by the numeral 1) and the straight line ΔRe1 −ΔRe2=−10 (denoted by the numeral 2) shown in FIG. 1.

The laminated optical film of the present embodiment includes the first optical anisotropic layer and the second optical anisotropic layer which respectively have ΔRe1 and ΔRe2 present in the area.

Provided with the first optical anisotropic layer and the second optical anisotropic layer that satisfy Relationship (1) above, the laminated optical film of the present embodiment is capable of preventing the in-plane retardation value (Re) of the laminated optical film as a whole from changing from an initial property value, even when Re1 of the first optical anisotropic layer and Re2 of the second optical anisotropic layer change due to a change in humidity conditions.

For instance, in the case where a first optical anisotropic layer and a second optical anisotropic layer which satisfy Relationship (1) above and also satisfy ΔRe1>0 and ΔRe2>0 are selected, even when Re1 and Re2 of the optical anisotropic layers change (increase) due to a change (rise) in the humidity of the laminated optical film, the increase in Re1 and the increase in Re2 offset each other.

Meanwhile, in the case where a first optical anisotropic layer and a second optical anisotropic layer which satisfy Relationship (1) above and also satisfy ΔRe1<0 and ΔRe2<0 are selected, even when Re1 and Re2 of the optical anisotropic layers change (decrease) due to a change (rise) in the humidity of the laminated optical film, the decrease in Re1 and the decrease in Re2 offset each other.

Additionally, in the case where a first optical anisotropic layer and a second optical anisotropic layer which satisfy Relationship (1) above and also satisfy ΔRe1<0 and ΔRe2>0 are selected, when the humidity of the laminated optical film changes (rises), Re1 of the first optical anisotropic layer decreases and Re2 of the second optical anisotropic layer increases.

In the laminated optical film of the present embodiment, including the first and second optical anisotropic layers whose slow phase axes are placed perpendicularly to each other, although the decrease in Re1 and the increase in Re2 do not offset each other, effects that the decrease and the increase have on Re of the laminated optical film as a whole are permissible as long as the first and second optical anisotropic layers satisfy Relationship (1) above.

Meanwhile, in the case where a first optical anisotropic layer and a second optical anisotropic layer which satisfy Relationship (1) above and also satisfy ΔRe1>0 and ΔRe2<0 are selected, when the humidity of the laminated optical film changes (rises), Re1 of the first optical anisotropic layer increases and Re2 of the second optical anisotropic layer decreases.

In the laminated optical film of the present embodiment, including the first and second optical anisotropic layers whose slow phase axes are placed perpendicularly to each other, although the increase in Re1 and the decrease in Re2 do not offset each other, effects that the increase and the decrease have on Re of the laminated optical film as a whole are permissible as long as the first and second optical anisotropic layers satisfy Relationship (1) above.

Additionally, in the case where a first optical anisotropic layer and a second optical anisotropic layer which satisfy ΔRe1=0 and ΔRe2=0 are selected, the in-plane retardation values of the optical anisotropic layers do not change even when the humidity of the laminated optical film changes, and thus Re of the laminated optical film as a whole does not change either.

Second Embodiment

A laminated optical film of a second embodiment includes at least a first optical anisotropic layer and a second optical anisotropic layer, and the first optical anisotropic layer and the second optical anisotropic layer are laid on top of each other such that a slow phase axis in the plane of the first optical anisotropic layer is substantially parallel to a slow phase axis in the plane of the second optical anisotropic layer.

When the first optical anisotropic layer and the second optical anisotropic layer are thus laid, a phase difference caused by the first optical anisotropic layer and a phase difference caused by the second optical anisotropic layer can be added together.

The first and second optical anisotropic layers whose slow phase axes are placed as described above satisfy Relationship (2) shown below.

$$-10 \text{ nm} \leq \Delta Re1 + \Delta Re2 \leq 10 \text{ nm} \quad \text{Relationship (2)}$$

Note that the definitions of $\Delta Re1$ and $\Delta Re2$ in Relationship (2) are the same as those of $\Delta Re1$ and $\Delta Re2$ in the first embodiment.

Figure 2:
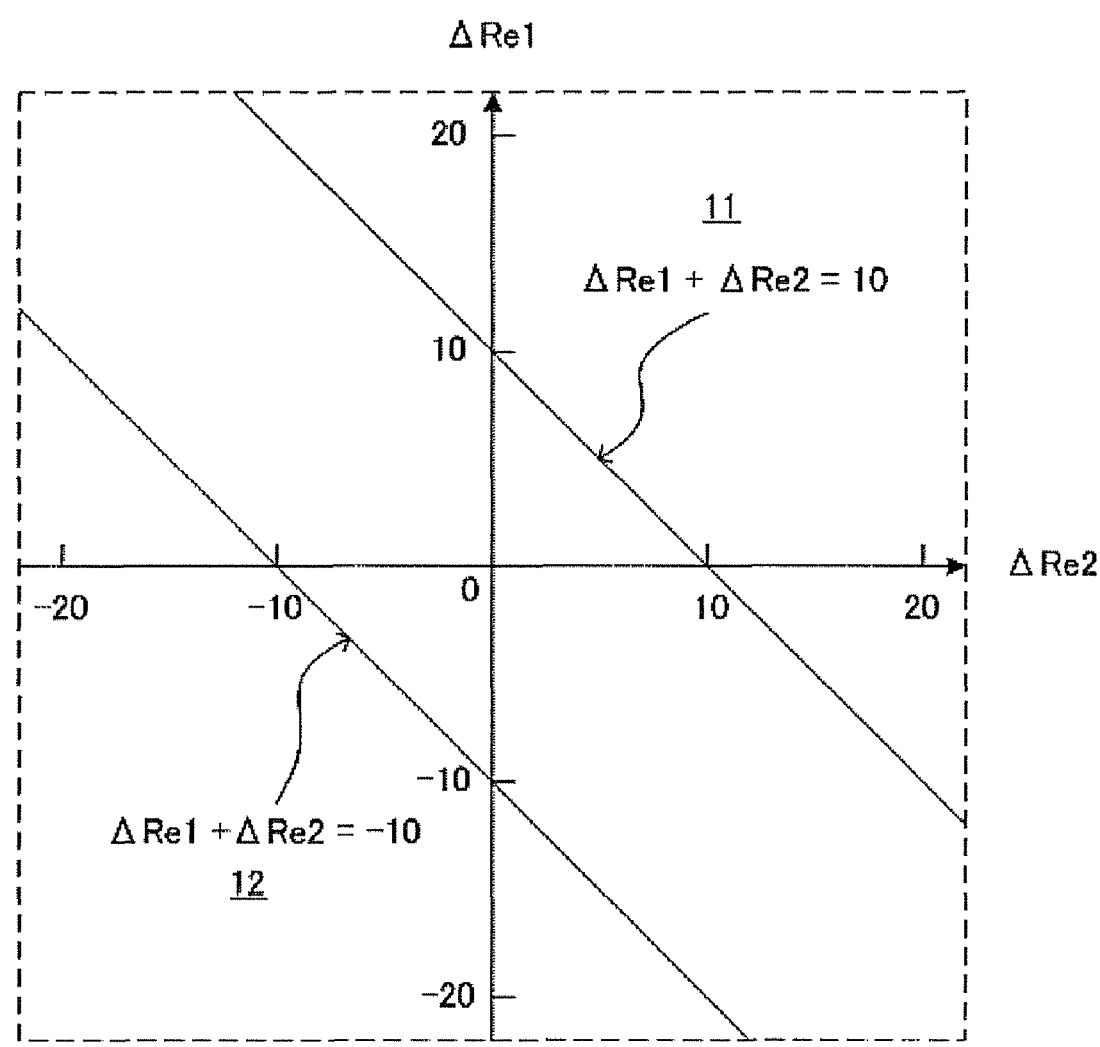
FIG. 2 is a graph showing Relationship (2).

Here, details of Relationship (2) are explained with reference to FIG. 2. FIG. 2 is a graph showing Relationship (2), in which the vertical axis represents $\Delta Re1$ and the horizontal axis represents $\Delta Re2$.

Relationship (2) corresponds to the area sandwiched between the straight line $\Delta Re1 + \Delta Re2 = 10$ (denoted by the numeral 11) and the straight line $\Delta Re1 + \Delta Re2 = -10$ (denoted by the numeral 12) shown in FIG. 2.

The laminated optical film of the present embodiment includes the first optical anisotropic layer and the second optical anisotropic layer which respectively have $\Delta Re1$ and $\Delta Re2$ present in the area.

Provided with the first optical anisotropic layer and the second optical anisotropic layer that satisfy Relationship (2) above, the laminated optical film of the present embodiment is capable of preventing the in-plane retardation value (Re) of the laminated optical film as a whole from changing from an initial property value, even when Re1 of the first optical anisotropic layer and Re2 of the second optical anisotropic layer change due to a change in humidity conditions.

For instance, in the case where a first optical anisotropic layer and a second optical anisotropic layer which satisfy Relationship (2) above and also satisfy $\Delta Re1 < 0$ and $\Delta Re2 > 0$ are selected, even when Re1 of the first optical anisotropic layer decreases and Re2 of the second optical anisotropic layer increases due to a change (rise) in the humidity of the laminated optical film, the decrease in Re1 and the increase in Re2 offset each other.

Meanwhile, in the case where a first optical anisotropic layer and a second optical anisotropic layer which satisfy Relationship (2) above and also satisfy $\Delta Re1 > 0$ and $\Delta Re2 < 0$ are selected, even when Re1 of the first optical anisotropic layer increases and Re2 of the second optical anisotropic layer decreases due to a change (rise) in the humidity of the laminated optical film, the increase in Re1 and the decrease in Re2 offset each other.

Additionally, in the case where a first optical anisotropic layer and a second optical anisotropic layer which satisfy Relationship (2) above and also satisfy $\Delta Re1 > 0$ and $\Delta Re2 > 0$ are selected, when the humidity of the laminated optical film changes (rises), Re1 and Re2 of the optical anisotropic layers increase.

In the laminated optical film of the present embodiment, including the first and second optical anisotropic layers whose slow phase axes are placed parallel to each other, although the increase in Re1 and the increase in Re2 do not offset each other, effects that these increases have on Re of the laminated optical film as a whole are permissible as long as the first and second optical anisotropic layers satisfy Relationship (2) above.

Meanwhile, in the case where a first optical anisotropic layer and a second optical anisotropic layer which satisfy Relationship (2) above and also satisfy $\Delta Re1 < 0$ and $\Delta Re2 < 0$ are selected, when the humidity of the laminated optical film changes (rises), Re1 and Re2 of the optical anisotropic layers decrease.

In the laminated optical film of the present embodiment, including the first and second optical anisotropic layers whose slow phase axes are placed parallel to each other, although the decrease in Re1 and the decrease in Re2 do not offset each other, effects that these decreases have on Re of the laminated optical film as a whole are permissible as long as the first and second optical anisotropic layers satisfy Relationship (2) above.

Additionally, in the case where a first optical anisotropic layer and a second optical anisotropic layer which satisfy $\Delta Re1 = 0$ and $\Delta Re2 = 0$ are selected, the in-plane retardation values of the optical anisotropic layers do not change even when the humidity of the laminated optical film changes, and thus Re of the laminated optical film as a whole does not change either.

Third Embodiment

A laminated optical film of a third embodiment includes at least a first optical anisotropic layer and a second optical anisotropic layer.

Here, Rth1 of the first optical anisotropic layer at a relative humidity of 50% is denoted by Rth1 (50% RH), and Rth1 of the first optical anisotropic layer at a relative humidity of 80% is denoted by Rth1 (80% RH).

Likewise, Rth2 of the second optical anisotropic layer at a relative humidity of 50% is denoted by Rth2 (50% RH), and Rth2 of the second optical anisotropic layer at a relative humidity of 80% is denoted by Rth2 (80% RH).

The expression Rth1 (80% RH)−Rth1 (50% RH) is denoted by $\Delta$Rth1, and the expression Rth2 (80% RH)−Rth2 (50% RH) is denoted by $\Delta$Rth2.

The laminated optical film of the present embodiment satisfies either Relationship (3) or Relationship (4) shown below.

$$\Delta Rth1 \geq 0 \text{ nm and } \Delta Rth2 \leq 0 \text{ nm} \quad \text{Relationship (3)}$$

$$\Delta Rth1 < 0 \text{ nm and } \Delta Rth2 > 0 \text{ nm} \quad \text{Relationship (4)}$$

As to the laminated optical film of the present embodiment, the retardation value Rth of the laminated optical film as a whole in its thickness direction satisfies $50 \text{ nm} \leq Rth \leq 500 \text{ nm}$.

Specifically, as to the laminated optical film of the present embodiment, Rth of the laminated optical film as a whole satisfies $50 \text{ nm} \leq Rth \leq 500 \text{ nm}$, and the retardation value (Rth) of the laminated optical film as a whole in its thickness direction does not change from an initial property value even when the optical property values (Rth1 and Rth2) of the optical anisotropic layers change due to a change in humidity conditions.

Figure 3:
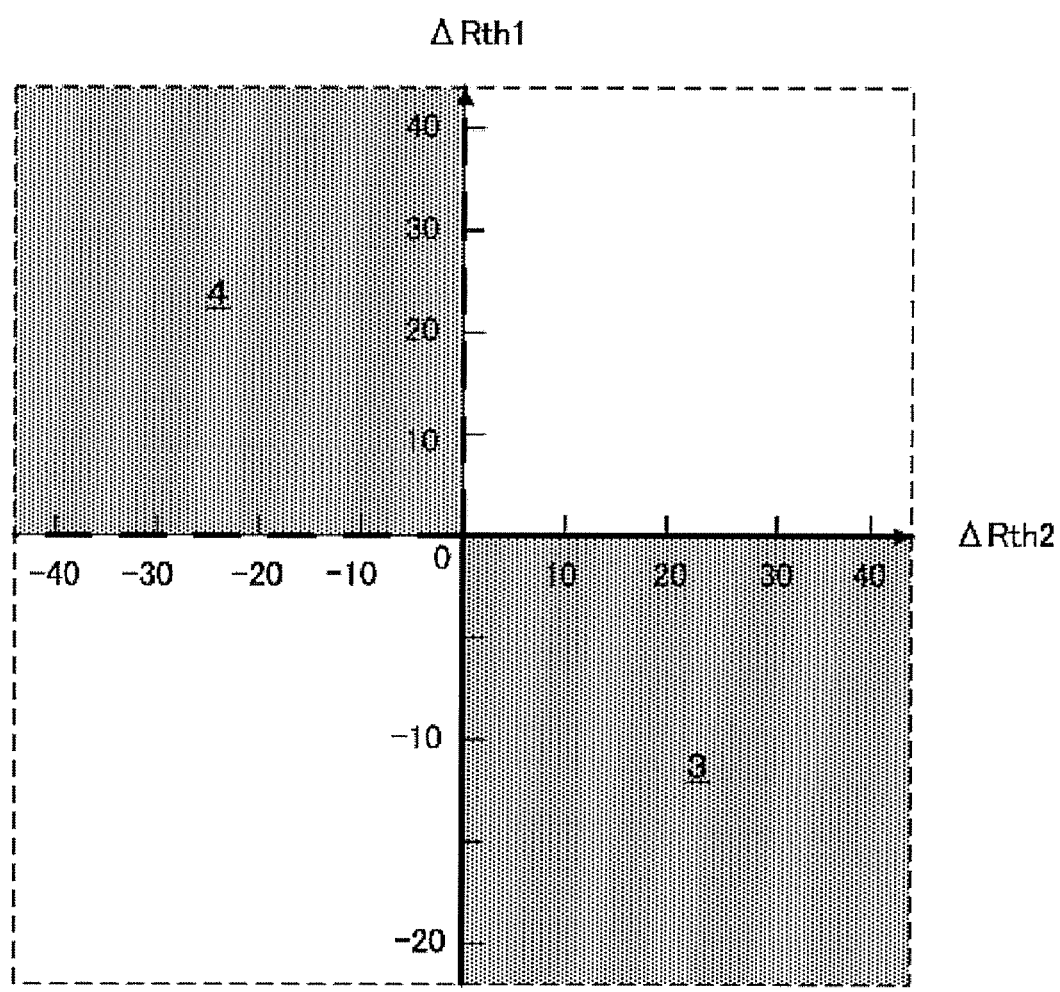
FIG. 3 is a graph showing Relationships (3) and (4).

Here, details of Relationships (3) and (4) are explained with reference to FIG. 3. FIG. 3 is a graph showing Relationships (3) and (4), in which the vertical axis represents $\Delta$Rth1 and the horizontal axis represents $\Delta$Rth2.

Relationship (3) corresponds to the area 3 (denoted by the numeral 3) and Relationship (4) corresponds to the area 4 (denoted by the numeral 4) shown in FIG. 3.

The laminated optical film of the present embodiment includes the first optical anisotropic layer and the second optical anisotropic layer which respectively have ΔRth1 and ΔRth2 present in either the area 3 or the area 4.

Provided with the first optical anisotropic layer and the second optical anisotropic layer that satisfy either Relationship (3) or Relationship (4) above, the laminated optical film of the present embodiment is capable of preventing the retardation value (Rth) of the laminated optical film as a whole in its thickness direction from changing from an initial property value, even when Rth1 of the first optical anisotropic layer and Rth2 of the second optical anisotropic layer change due to a change in humidity conditions.

For instance, in the case where a first optical anisotropic layer and a second optical anisotropic layer which satisfy Relationship (3) above are selected, even when Rth1 of the first optical anisotropic layer decreases and Rth2 of the second optical anisotropic layer increases due to a change (rise) in humidity, the decrease in Rth1 and the increase in Rth2 offset each other.

Meanwhile, in the case where a first optical anisotropic layer and a second optical anisotropic layer which satisfy Relationship (4) above are selected, even when Rth1 of the first optical anisotropic layer increases and Rth2 of the second optical anisotropic layer decreases due to a change (rise) in humidity, the increase in Rth1 and the decrease in Rth2 offset each other.

(Production of Laminated Optical Film)

The first optical anisotropic layer and the second optical anisotropic layer constituting the laminated optical film of the present invention are produced, being suitably selected from known materials so as to satisfy at least any one of Relationships (1) to (4) above.

For instance, it is possible to use optical films formed of known polymers exemplified by cellulose esters such as cellulose acetate and cellulose diacetate, norbornene polymers, and acrylic polymers such as polymethyl methacrylate.

Also, optical films formed of commercially available polymers exemplified by norbornene polymers such as ARTON (registered trademark) and ZEONEX (registered trademark) may be used.

For instance, as to the laminated optical film of the first embodiment, it is desirable to select a material which enables both of the optical property values (Re1 and Re2) of the first and second optical anisotropic layers to increase or decrease due to a humidity change. In the first embodiment, selection of such a material makes it possible to offset a change in the optical properties of the optical anisotropic layers caused by a humidity change.

Meanwhile, as to the laminated optical film of the second embodiment, it is desirable to select a material which enables the optical property value (e.g. Re1) of one optical anisotropic layer and the optical property value (e.g. Re2) of the other optical anisotropic layer to increase and decrease respectively due to a humidity change. In the second embodiment, selection of such a material makes it possible to offset a change in the optical properties of the optical anisotropic layers caused by a humidity change.

(Third Optical Anisotropic Layer)

The laminated optical film of the present invention may further include a third optical anisotropic layer. The third optical anisotropic layer is preferably an optical anisotropic layer formed of a liquid crystal compound.

[Rod-like Liquid Crystal Compound]

Suitable examples of rod-like liquid crystal compounds able to be used for the present invention include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles.

Examples of the rod-like liquid crystal compounds also include metal complexes. Further, liquid crystal polymers in which the rod-like liquid crystal compounds are contained in their repeating units may also be used. In other words, the rod-like liquid crystal compounds may be bonded to (liquid crystal) polymers.

Rod-like liquid crystal compounds are described in Chaps. 4, 7 and 11 in Vol. 22 of Kikan Kagaku Sosetsu "Chemistry of Liquid Crystal Compounds (1994) written by The Chemical Society of Japan", and Chap 3 in "Liquid Crystal Device Handbook written by No. 142 Committee of Japan Society for the Promotion of Science".

The birefringence of a rod-like liquid crystal compound used in the present invention is preferably in the range of 0.001 to 0.7.

The rod-like liquid crystal compound preferably contains a polymerizable group so as to fix its alignment state. For the polymerizable group, an unsaturated polymerizable group or an epoxy group is suitable, preferably an unsaturated polymerizable group, particularly preferably an ethylene-based unsaturated polymerizable group.

[Discotic Liquid Crystal Compound]

Examples of discotic liquid crystal compounds include the benzene derivatives described on p. 111 in Vol. 71, "Mol. Cryst." (1981), a study report by C. Destrade et al.; the truxene derivatives described on p. 82 in Vol. 78, "Physics lett, A" (1990), and p. 141 in Vol. 122, "Mol. Cryst." (1985), study reports by C. Destrade et al.; the cyclohexane derivatives described in p. 70 in Vol. 96, "Angew. Chem" (1984), a study report by B. Kohne et al.; and the azacrown macrocycles and the phenylacetylene macrocycles described on p. 1,794, "J. Chem. Commun." (1985), a study report by J. M. Lehn, et al., and p. 2,655 in Vol. 116, "J. Am. Chem. Soc." (1994), a study report by J. Zhang et al.

Examples of the discotic liquid crystal compounds also include compounds exhibiting liquid crystallinity, in which mother nuclei at the centers of molecules are radially substituted by straight-chain alkyl groups, alkoxy groups or substituted benzoyloxy groups as side chains of the mother nuclei. The discotic liquid crystal compounds are preferably compounds in which molecules or aggregates of molecules have rotational symmetry and can give a fixed alignment.

In the case where the third optical anisotropic layer is formed of a discotic liquid crystal compound, compounds finally contained in the third optical anisotropic layer do not need to exhibit liquid crystallinity.

For instance, in the case where the third optical anisotropic layer is formed by using a low-molecular discotic liquid crystal compound having a group which reacts by heat or light, then making the group react by heat or light such that the low-molecular discotic liquid crystal compound is polymerized or cross-linked and becomes high in molecular weight, compounds contained in the third optical anisotropic layer may be lacking in liquid crystallinity.

Suitable examples of discotic liquid crystal compounds are described in JP-A No. 08-50206, Paragraph [0052] of JP-A No. 2006-76992, and Paragraphs [0040] to [0063] of JP-A No. 2007-2220.

For instance, compounds represented by General Formulae (DI) and (DII) below are suitable for the discotic liquid crystal compounds because they exhibit high birefringence.

Among those compounds represented by General Formulae (DI) and (DII) below, compounds which exhibit discotic liquid crystallinity are preferable, and compounds each exhibiting a discotic nematic phase are particularly preferable.

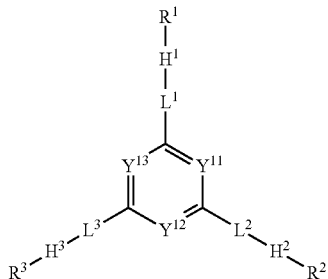

General Formula (DI)

In General Formula (DI), $R^1$, $R^2$ and $R^3$ each independently denote a group represented by General Formula (DI-R) below.

*-(-$L^{21}$-$Q^2$)$_{n1}$-$L^{22}$-$L^{23}$-$Q^1$   <General Formula (DI-R)>

In General Formula (DI-R), the symbol "*" denotes a position where the group bonds to the side of any one of $H^1$ to $H^3$ in General Formula (DI), $L^{21}$ denotes a single bond or a divalent linking group, $Q^2$ denotes a divalent group having at least one cyclic structure, n1 denotes an integer of 0 to 4, $L^{22}$ denotes a divalent linking group selected from —O—, —O—CO—, —CO—O—, —O—CO—O—, —S—, —NH—, —$SO_2$—, —$CH_2$—, —CH=CH— and —C≡C—, with the symbol "**" denoting a position where the divalent linking group bonds to the side of $Q^2$, $L^{23}$ denotes a divalent linking group selected from —O—, —S—, —C(=O)—, —$SO_2$—, —NH—, —$CH_2$—, —CH=CH—, C≡C— and combinations thereof, and $Q^1$ denotes a hydrogen atom or a polymerizable group (when the polymerizable group contains a hydrogen atom, the hydrogen group may be substituted by a substituent). When n1 is 2 or greater, the plurality of -$L^{21}$-$Q^2$ may be the same or different.

$H^1$, $H^2$ and $H^3$ each independently denote a linking group represented by General Formula (DI-A) below or a linking group represented by General Formula (DI-B) below.

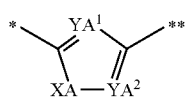

<General Formula (DI-A)>

In General Formula (DI-A), $YA^1$ and $YA^2$ each independently denote a methine group or a nitrogen atom. It is desirable that at least one of $YA^1$ and $YA^2$ be a nitrogen atom, and it is more desirable that both $YA^1$ and $YA^2$ be nitrogen atoms. XA denotes an oxygen atom, a sulfur atom, a methylene group or an imino group, preferably an oxygen atom. The symbol "*" denotes a position where the linking group bonds to the side of any one of $L^1$ to $L^3$ in General Formula (DI) above, and the symbol "**" denotes a position where the linking group bonds to the side of any one of $R^1$ to $R^3$ in General Formula (DI) above.

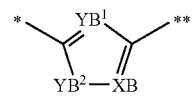

<General Formula (DI-B)>

In General Formula (DI-B), $YB^1$ and $YB^2$ each independently denote a methine group or a nitrogen atom. It is desirable that at least one of $YB^1$ and $YB^2$ be a nitrogen atom, and it is more desirable that both $YB^1$ and $YB^2$ be nitrogen atoms. XB denotes an oxygen atom, a sulfur atom, a methylene group or an imino group, preferably an oxygen atom. The symbol "*" denotes a position where the linking group bonds to the side of any one of $L^1$ to $L^3$ in General Formula (DI) above, the symbol "**" denotes a position where the linking group bonds to the side of any one of $R^1$ to $R^3$ in General Formula (DI) above.

$L^1$, $L^2$ and $L^3$ each independently denote a single bond or a divalent linking group.

$Y^{11}$, $Y^{12}$ and $Y^{13}$ each independently denote a methine group or a nitrogen atom.

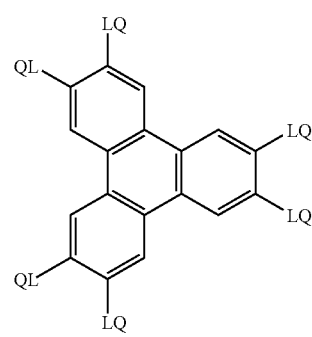

General Formula (DII)

In General Formula (DII), LQ (or QL) denotes a combination of a divalent linking group (L) and a polymerizable group (Q). It is desirable that the divalent linking group (L) be a divalent linking group selected from an alkylene group, an alkenylene group, an arylene group, —CO—, —NH—, —O—, —S— and combinations thereof.

It is more desirable that the divalent linking group (L) be a divalent linking group formed by combining at least two divalent groups selected from an alkylene group, an arylene group, —CO—, —NH—, —O— and —S—.

It is most desirable that the divalent linking group (L) be a divalent linking group formed by combining at least two divalent groups selected from an alkylene group, an arylene group, —CO— and —O—.

The alkylene group preferably has 1 to 12 carbon atoms.
The alkenylene group preferably has 2 to 12 carbon atoms.
The arylene group preferably has 6 to 10 carbon atoms.

The polymerizable group (Q) is decided according to the type of polymerization reaction. The polymerizable group (Q) is preferably an unsaturated polymerizable group or an epoxy group, particularly an unsaturated polymerizable group, more particularly an ethylene-based unsaturated polymerizable group.

Additionally, the plurality of combinations of L and Q may be different from one another but are preferably the same.

Suitable examples of the discotic liquid crystal compounds include the compounds described in JP-A No. 2005-301206.

The third optical anisotropic layer is preferably formed by placing a composition, which contains at least one kind of liquid crystal compound, on a surface (e.g. alignment film surface), bringing molecules of the liquid crystal compound into a desired alignment state, hardening the molecules by polymerization and thusly fixing the alignment state. The alignment state that is fixed is preferably a hybrid alignment state. The hybrid alignment state means an alignment state in which the direction of the director of liquid crystal molecules continuously changes in the layer thickness direction. In the case of rod-like molecules, the director faces the major axis direction. In the case of discotic molecules, the director faces the direction perpendicular to the discotic surface.

The composition may contain one or more kinds of additives for the purpose of bringing the molecules of the liquid crystal compound into a desired alignment state and improving the coatability or curability of the composition.

In order for the molecules of the liquid crystal compound (particularly rod-like liquid crystal compound) to be aligned in a hybrid manner, an additive (hereinafter referred to as "air interface alignment controlling agent") capable of controlling the alignment on the air interface side of the layer may be added. Examples of the additive include low-molecular and high-molecular compounds which contain hydrophilic groups such as fluorinated alkyl groups and sulfonyl groups. Specific examples of air interface alignment controlling agents able to be used herein include the compounds described in JP-A No. 2006-267171.

In the case where the composition is prepared as a coating solution, and the third optical anisotropic layer is formed by applying the coating solution, a surfactant may be added so as to improve the coatability of the coating solution. For the surfactant, a fluorine-based compound is preferable, and specific examples thereof include the compounds described in Paragraphs [0028] to [0056] in JP-A No. 2001-330725. Also, commercially available products such as "MEGAFAC F780" (produced by Dainippon Ink And Chemicals, Incorporated) may be used as well.

Also, the composition preferably contains a polymerization initiator. The polymerization initiator may be a thermal polymerization initiator or a photopolymerization initiator; however, a photopolymerization initiator is preferable in that it can be easily controlled, for instance. Suitable examples of photopolymerization initiators which generate radicals by the action of light include α-carbonyl compounds (as described in the specifications of U.S. Pat. Nos. 2,367,661 and 2,367,670), acyloin ethers (as described in the specification of U.S. Pat. No. 2,448,828), α-hydrocarbon-substituted aromatic acyloin compounds (as described in the specification of U.S. Pat. No. 2,722,512), polynuclear quinone compounds (as described in the specifications of U.S. Pat. Nos. 3,046,127 and 2,951,758), combinations of triarylimidazole dimers and p-aminophenyl ketone (as described in the specification of U.S. Pat. No. 3,549,367), acridine and phenazine compounds (as described in JP-A No. 60-105667 and U.S. Pat. No. 4,239,850), oxadiazole compounds (as described in U.S. Pat. No. 4,212,970), acetophenone compounds, benzoin ether compounds, benzyl compounds, benzophenone compounds and thioxanthone compounds. Examples of the acetophenone compounds include 2,2-diethoxyacetophenone, 2-hydroxymethyl-1-phenylpropane-1-one, 4'-isopropyl-2-hydroxy-2-methyl-propiophenone, 2-hydroxy-2-methyl-propiophenone, p-dimethylaminoacetone, p-tert-butyldichloroacetophenone, p-tert-butyltrichloroacetophenone and p-azidobenzalacetophenone. Examples of the benzyl compounds include benzyl, benzyldimethylketal, benzyl-β-methoxyethylacetal and 1-hydroxycyclohexylphenylketone. Examples of the benzoin ether compounds include benzoin, benzoin methyl ether, benzoin ethyl ether, benzoin n-propyl ether, benzoin isopropyl ether, benzoin n-butyl ether and benzoin isobutyl ether. Examples of the benzophenone compounds include benzophenone, o-benzoyl methyl benzoate, Michler's Ketone, 4,4'-bisdiethylaminobenzophenone and 4,4'-dichlorobenzophenone. Examples of the thioxanthone compounds include thioxanthone, 2-methylthioxanthone, 2-ethylthioxanthone, 2-isopropylthioxanthone, 4-isopropylthioxanthone, 2-chlorothioxanthone and 2,4-diethylthioxanthone. Among photosensitive radical polymerization initiators made of such aromatic ketones, the acetophenone compounds and the benzyl compounds are particularly preferable in terms of curing property, storage stability and smell. Each of the photosensitive radical polymerization initiators made of such aromatic ketones may be used alone or in combination with two or more in accordance with desired performance.

Also, a sensitizer may be used in addition to the polymerization initiator, for the purpose of enhancing sensitivity. Examples of the sensitizer include n-butylamine, triethylamine, tri-n-butylphosphine and thioxanthone.

The photopolymerization initiator may be composed of a plurality of photopolymerization initiators. As for the amount of the photopolymerization initiator used, the photopolymerization initiator preferably occupies 0.01% by mass to 20% by mass, more preferably 0.5% by mass to 5% by mass, of the solid content of the coating solution. In light irradiation for polymerization of the liquid crystal compound, an ultraviolet ray is preferably used.

The composition may contain a non-liquid crystal polymerizable monomer besides the polymerizable liquid crystal compound. For the polymerizable monomer, a compound having a vinyl group, a vinyloxy group, an acryloyl group or a methacryloyl group is suitable. It should be noted that use of a polymerizable multifunctional monomer having two or more reactive functional groups, for example ethylene oxide-modified trimethylolpropane acrylate, is favorable because there is an improvement in durability.

Since the non-liquid crystal polymerizable monomer is a non-liquid crystal component, it is desirable that the amount thereof be less than 15% by mass, preferably in the range of 0% by mass to 10% by mass or so, in relation to the liquid crystal compound.

The third optical anisotropic layer can be formed as follows: the composition is prepared as a coating solution, the coating solution is applied, for example, over the surface of an alignment film formed on a support, the coating solution is dried so as to remove the solvent and align molecules of the liquid crystal compound, and then the molecules are hardened by polymerization.

Examples of the method for applying the coating solution include known coating methods such as curtain coating, dip coating, spin coating, printing, spray coating, slot coating, roll coating, slide coating, blade coating, gravure coating and wire bar coating.

When the coating film is dried, it may be heated. A desired alignment state is obtained by aligning the molecules of the liquid crystal compound in the coating film at the same time when the coating film is dried to remove the solvent.

Next, the polymerization is made to proceed by ultraviolet irradiation, etc. so as to fix the alignment state, and the optical anisotropic layer is thus formed. In the light irradiation for the polymerization, an ultraviolet ray is preferably used. The irradiation energy is preferably 20 mJ/cm$^2$ to 50 J/cm$^2$, more preferably 100 mJ/cm$^2$ to 800 mJ/cm$^2$. The light irradiation may be carried out under a heated condition to accelerate the photopolymerization.

The thickness of the third optical anisotropic layer is not particularly limited and may be suitably selected in accordance with the intended use; however, it is preferably 0.1 μm to 10 μm, more preferably 0.5 μm to 5 μm.

It is desirable to form the third optical anisotropic layer by utilizing an alignment film. Examples of alignment films able to be utilized herein include polyvinyl alcohol films and polyimide films.

(Alignment Film)

In the case where the laminated optical film of the present invention includes the third optical anisotropic layer, it is desirable to form an alignment film between the third optical anisotropic layer and the second optical anisotropic layer (first optical anisotropic layer) over which the third optical anisotropic layer is to be laid.

In the present invention, the alignment film is preferably a layer formed of cross-linked polymers.

The polymers used for the alignment film may be polymers which are cross-linkable per se, or polymers which are cross-linked by a cross-linking agent.

The alignment film can be formed as follows: polymers having functional groups or polymers into which functional groups have been introduced are made to react with each other by light, heat, change in pH, etc.; alternatively, a cross-linking agent that is a highly reactive compound is used, and a bonding group derived from the cross-linking agent is introduced between polymers so as to cross-link the polymers.

Normally, the alignment film made of cross-linked polymers can be formed by applying a coating solution, which contains the polymers or a mixture of the polymers and the cross-linking agent, onto the second optical anisotropic layer, then subjecting the coating solution to heating, etc.

In the after-mentioned rubbing step, the degree of cross-linkage is preferably increased so as to reduce the generation of dust on the alignment film. When the ratio (Ma/Mb) of the amount (Ma) of a cross-linking agent that remains after cross-linkage to the amount (Mb) of a cross-linking agent added into the coating solution is subtracted from 1, and the obtained value (1−(Ma/Mb)) is defined as the degree of cross-linkage, the degree of cross-linkage is preferably 50% to 100%, more preferably 65% to 100%, most preferably 75% to 100%.

In the present invention, the polymers used for the alignment film may be polymers which are cross-linkable per se, or polymers which are cross-linked by a cross-linking agent. Additionally, polymers having both such functions may also be used.

Examples of the polymers include polymers such as polymethyl methacrylate, acrylic acid-methacrylic acid copolymers, styrene-maleimide copolymers, polyvinyl alcohol, modified polyvinyl alcohols, poly(N-methylolacrylamide), styrene-vinyl toluene copolymers, chlorosulfonated polyethylene, nitrocellulose, polyvinyl chloride, chlorinated polyolefins, polyesters, polyimides, vinyl acetate-vinyl chloride copolymers, ethylene-vinyl acetate copolymers, carboxymethyl cellulose, polyethylene, polypropylene and polycarbonates; and compounds such as silane coupling agents.

Suitable examples of the polymers include water-soluble polymers such as poly(N-methylolacrylamide), carboxymethyl cellulose, gelatin, polyvinyl alcohol and modified polyvinyl alcohols; particularly gelatin, polyvinyl alcohol and modified polyvinyl alcohols; more particularly polyvinyl alcohol and modified polyvinyl alcohols.

Among the polymers, polyvinyl alcohol and modified polyvinyl alcohols are preferable. The saponification degree of the polyvinyl alcohol is, for example, 70% to 100%, generally 80% to 100%, preferably 85% to 95%.

The polymerization degree thereof is preferably in the range of 100 to 3,000. Examples of the modified polyvinyl alcohols include modified products of polyvinyl alcohol such as those that have been subjected to copolymerization (for example, COONa, Si(OH)$_3$, N(CH$_3$)$_3$.Cl, C$_9$H$_{19}$COO, SO$_3$Na, C$_{12}$H$_{25}$ and the like are introduced as modifying groups), those that have been subjected to chain transfer (for example, COONa, SH, C$_{12}$H$_{25}$ and the like are introduced as modifying groups), and those that have been subjected to block polymerization (for example, COOH, CONH$_2$, COOR, C$_6$H$_5$ and the like are introduced as modifying groups).

The polymerization degree thereof is preferably in the range of 100 to 3,000. Among these compounds, preference is given to unmodified and modified polyvinyl alcohols which are 80% to 100% in saponification degree, and particular preference is given to unmodified and alkylthio-modified polyvinyl alcohols which are 85% to 95% in saponification degree.

For the modified polyvinyl alcohols used for the alignment film, reaction products between polyvinyl alcohol and compounds represented by General Formula (2) below are suitable. In General Formula (2) below, R$^1$ denotes an unsubstituted alkyl group, or an alkyl group substituted by an acryloyl group, a methacryloyl group or an epoxy group; W denotes a halogen atom, an alkyl group or an alkoxy group; X denotes a group of atoms necessary to form an active ester, an acid anhydride or an acid halide; l denotes 0 or 1; and n denotes an integer of 0 to 4.

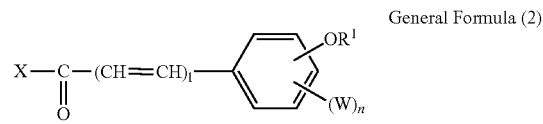

General Formula (2)

Also, for the modified polyvinyl alcohols used for the alignment film, reaction products between polyvinyl alcohol and compounds represented by General Formula (3) below are suitable as well. In General Formula (3) below, X$^1$ denotes a group of atoms necessary to form an active ester, an acid anhydride or an acid halide; and m denotes an integer of 2 to 24.

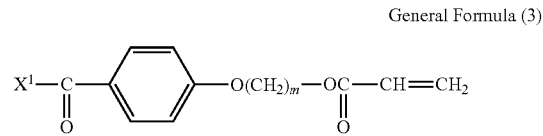

General Formula (3)

Examples of the polyvinyl alcohols which are used so as to react with the compounds represented by General Formulae (2) and (3) include the unmodified polyvinyl alcohol; and the modified products of polyvinyl alcohol such as those that have been subjected to copolymerization, those that have been subjected to chain transfer and those that have been subjected to block polymerization.

Suitable examples of the specific modified polyvinyl alcohols are described in detail in JP-A No. 08-338913.

When a hydrophilic polymer such as polyvinyl alcohol is used for the alignment film, it is desirable to control the moisture content percentage in view of film hardness, and the moisture content percentage is preferably controlled so as to be 0.4% to 2.5%, more preferably 0.6% to 1.6%. The moisture content percentage can be measured with a commercially available moisture content percentage measurer designed in accordance with Karl Fischer's method.

Additionally, the alignment film preferably has a thickness of 10 μm or less.

[Method for Producing Laminated Optical Film]

When the laminated optical film of the present invention is the laminated optical film according to the first embodiment or second embodiment, the laminated optical film is produced by sticking together the first optical anisotropic layer and the second optical anisotropic layer such that their slow phase axes are placed substantially perpendicularly or substantially parallel to each other.

The directional setting of the slow phase axis of each optical anisotropic layer, the method of sticking the optical anisotropic layers together, etc. may be suitably selected from known methods.

For instance, the laminated optical film of the present invention can be produced by sticking together a first optical anisotropic layer in the form of a roll and a second optical anisotropic layer in the form of a roll, in accordance with roll-to-roll processing.

Therefore, the laminated optical film of the present invention can be produced utilizing an existing production facility, and so the laminated optical film can be mass-produced at a low cost.

[Polarizing Plate]

The polarizing plate includes at least the laminated optical film of the present invention and a polarizer, and further includes other components in accordance with the necessity.

(Polarizer)

The polarizer is preferably a coating-type polarizer typified by a product produced by Optiva Inc., or a polarizer composed of a binder and iodine or a dichroic pigment.

The iodine and the dichroic pigment exhibit polarizing properties by being aligned in the binder. The iodine and the dichroic pigment are preferably aligned along binder molecules; alternatively, the dichroic pigment is preferably aligned in one direction by self-organization of the dichroic pigment, which can be likened to self-organization of a liquid crystal.

Generally, a polarizer that is commercially available at present is produced by immersing a stretched polymer in a solution containing iodine or a dichroic pigment placed in a bath, and making the iodine or the dichroic pigment permeate into a binder.

Also, in the commercially available polarizer, the iodine or the dichroic pigment spreads in a position that is away from a polymer surface by approximately 4 μm (a total of approximately 8 μm with respect to both sides); accordingly, in order to obtain sufficient polarizing properties, the polarizer needs to have a thickness of at least 10 μm. The degree of the permeation can be controlled by adjusting the concentration of the solution containing the iodine or the dichroic pigment, the temperature of the bath, or the time of the immersion.

Therefore, as described above, the lower limit of the thickness of the binder is preferably 10 μm. As for the upper limit of the thickness, the smaller, the better, in terms of prevention of light leakage that arises when the polarizing plate is used in a liquid crystal display device. Specifically, the upper limit of the thickness is preferably less than or equal to the thickness (approximately 30 μm) of a polarizing plate that is commercially available at present, more preferably less than or equal to 25 μm, even more preferably less than or equal to 20 μm. When it is less than or equal to 20 μm, light leakage is not observed in a 17-inch liquid crystal display device.

The polarizer may be formed by cross-linking binders. As the binders for the polarizer, polymers which are cross-linkable per se may be used. The polarizer can be formed as follows: polymers having functional groups or polymers into which functional groups have been introduced are cross-linked by making those functional groups react together by means of light, heat or change in pH.

Also, a cross-linked structure may be introduced into polymers, using a cross-linking agent. The polarizer can be formed as follows: a cross-linking agent that is a highly reactive compound is used, and a bonding group derived from the cross-linking agent is introduced between binders so as to cross-link the binders.

Generally, cross-linking can be carried out by applying a coating solution, which contains cross-linkable polymers or a mixture of polymers and a cross-linking agent, onto a support, then heating the coating solution. Since durability only needs to be secured in time for a stage where the production of a product is completed, the polymers may be cross-linked at any stage in the process of producing the polarizing plate.

As described above, the binders for the polarizer may be polymers which are cross-linkable per se, or polymers which are cross-linked by a cross-linking agent.

Examples of the polymers include polymethyl methacrylate, polyacrylic acid, polymethacrylic acid, polystyrene, polyvinyl alcohol, modified polyvinyl alcohols, poly(N-methylolacrylamide), polyvinyl toluene, chlorosulfonated polyethylene, nitrocellulose, chlorinated polyolefins (e.g. polyvinyl chloride), polyesters, polyimides, polyvinyl acetate, polyethylene, carboxymethyl cellulose, polypropylene, polycarbonates, and copolymers thereof (e.g. acrylic acid-methacrylic acid copolymers, styrene-maleimide copolymers, styrene-vinyl toluene copolymers, vinyl acetate-vinyl chloride copolymers and ethylene-vinyl acetate copolymers). Silane coupling agents may be used as the polymers.

Suitable examples of the polymers include water-soluble polymers such as poly(N-methylolacrylamide), carboxymethyl cellulose, gelatin, polyvinyl alcohol and modified polyvinyl alcohols; particularly gelatin, polyvinyl alcohol and modified polyvinyl alcohols; more particularly polyvinyl alcohol and modified polyvinyl alcohols.

The polyvinyl alcohol and the modified polyvinyl alcohols are preferably 70% to 100% in saponification degree, more preferably 80% to 100% in saponification degree, most preferably 95% to 100% in saponification degree. The polymerization degree of the polyvinyl alcohol is preferably 100 to 5,000.

The modified polyvinyl alcohols are obtained by introducing modifying groups into the polyvinyl alcohol by means of modification based upon copolymerization, modification based upon chain transfer, or modification based upon block polymerization. In the modification based upon copolymerization, COONa, $Si(OH)_3$, $N(CH_3)_3 \cdot Cl$, $C_9H_{19}COO$, $SO_3Na$ and $C_{12}H_{25}$ can be introduced as modifying groups. In the modification based upon chain transfer, COONa, SH and $SC_{12}H_{25}$ can be introduced as modifying groups.

The polymerization degree of the modified polyvinyl alcohols is preferably 100 to 3,000. Modified polyvinyl alcohols are described in JP-A Nos. 08-338913, 09-152509 and 09-316127.

Also, unmodified and alkylthio-modified polyvinyl alcohols which are 85% to 95% in saponification degree are particularly preferable.

Further, each of the polyvinyl alcohol and the modified polyvinyl alcohols may be used in combination with two or more.

Cross-linking agents are described in the specification of U.S. Reissue Pat. No. 23,297, and these cross-linking agents can be used in the present invention as well. Also, boron compounds (e.g. boric acid and borax) can be used herein as cross-linking agents.

When the cross-linking agent for the binders is added in large amounts, it is possible to improve the resistance of the polarizer to heat and humidity. However, if 50% by mass or more of the cross-lining agent is added in relation to the binders, the aligning properties of the iodine or the dichroic pigment degrade. The amount of the cross-linking agent added is preferably 0.1% by mass to 20% by mass, more preferably 0.5% by mass to 15% by mass, in relation to the binders.

The binders contain an unreacted cross-linking agent to some extent, even after the cross-linking reaction has finished. It should, however, be noted that the amount of the residual cross-linking agent in the binders is preferably 1.0% by mass or less, more preferably 0.5% by mass or less.

When the amount of the residual cross-linking agent in the binders is greater than 1.0% by mass, there may be a problem in relation to durability. Specifically, in the case where a polarizer with a large amount of a residual cross-linking agent is installed in a liquid crystal display device and used for a long period of time or left to stand in a high-temperature and high-humidity atmosphere for a long period of time, there may be a reduction in polarization degree.

An azo pigment, a stilbene pigment, a pyrazolone pigment, a triphenylmethane pigment, a quinoline pigment, an oxazine pigment, a thiazine pigment or an anthraquinone pigment is used for the dichroic pigment. The dichroic pigment is preferably soluble in water. Also, the dichroic pigment preferably has a hydrophilic substituent (e.g. sulfo group, amino group or hydroxyl group).

Examples of the dichroic pigment include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59 and C.I. Acid Red 37.

Dichroic pigments are described in JP-A Nos. 01-161202, 01-172906, 01-172907, 01-183602, 01-248105, 01-265205 and 07-261024.

A free acid, or a salt such as an alkali metal salt, ammonium salt or amine salt is use for the dichroic pigment. Combining two or more kinds of dichroic pigments makes it possible to produce a polarizer with various hues. A polarizer using a compound (pigment) which becomes black when polarizing axes are placed perpendicularly to each other; or a polarizer or polarizing plate which includes various dichroic molecules to become black is preferable in terms of both single plate transmittance and polarization ratio.

The polarizer is preferably dyed with iodine or a dichroic dye after a film formed of the binder has been stretched in the lengthwise direction (MD direction) of the polarizer.

In the case of a stretching process, the draw ratio is preferably 2.5 to 30.0, more preferably 3.0 to 10.0. The binder can be stretched by dry stretching in the air.

Also, the binder may be subjected to wet stretching by immersion in water. The draw ratio concerning the dry stretching is preferably 2.5 to 5.0, and the draw ratio concerning the wet stretching is preferably 3.0 to 10.0.

The stretching step may be carried out on several separate occasions. Carrying it out on several separate occasions makes uniform stretching possible even with a high draw ratio.

Before the stretching, lateral or longitudinal stretching may be carried out on a small scale (to such an extent that widthwise contraction can be prevented). The stretching can be carried out by performing tenter stretching based upon biaxial stretching, separately in a process designed for the left side of the binder and in a process designed for the right side of the binder. The biaxial stretching is similar to that carried out in ordinary film production.

It is desirable to place protective films on both surfaces of the polarizer and to use part of the roll-formed optical film of the present invention as a protective film for one surface.

For instance, it is desirable that the protective film, the polarizer, the third optical anisotropic layer, the second optical anisotropic layer and the first optical anisotropic layer be laid on top of one another in this order, or that the protective film, the polarizer, the third optical anisotropic layer, the second optical anisotropic layer, the alignment film and the first optical anisotropic layer be laid on top of one another in this order.

The structure of the polarizing plate of the present invention is, however, not limited to these structures; for instance, the polarizer and the first optical anisotropic layer on the surface side may be stuck together. They may be stuck together using an adhesive, and examples of the adhesive include polyvinyl alcohol resins (including polyvinyl alcohols modified by an acetoacetyl group, a sulfonic acid group, a carboxyl group and an oxyalkylene group) and boron compound aqueous solutions. Among these, polyvinyl alcohol resins are preferable.

The thickness of the adhesive layer after dried is preferably in the range of 0.01 μm to 10 μm, more preferably 0.05 μm to 5 μm.

In the case where the polarizing plate of the present invention is used in a liquid crystal display device, it is desirable to provide an antireflective layer over the surface on the visible side, and this antireflective layer may serve also as a protective layer on the visible side of the polarizer.

It is desirable that the internal haze of the antireflective layer be made greater than or equal to 50% in view of reducing color change caused by change in the visual angle of the liquid crystal display device. Specific suitable examples of the foregoing are described in JP-A Nos. 2001-33783, 2001-343646 and 2002-328228.

To increase the contrast ratio of the liquid crystal display device, the transmittance of the polarizer is preferably made high, and also the polarization degree is preferably made high.

The transmittance of the polarizer of the present invention is preferably in the range of 30% to 50%, more preferably in the range of 35% to 50%, most preferably in the range of 40% to 50%, with respect to light having a wavelength of 550 nm.

The polarization degree is preferably in the range of 90% to 100%, more preferably in the range of 95% to 100%, most preferably in the range of 99% to 100%, with respect to light having a wavelength of 550 nm.

[Method for Producing Polarizing Plate]

The polarizing plate can be produced by sticking the polarizer to the laminated optical film in accordance with a known method.

[Liquid Crystal Display Device]

A liquid crystal display device includes at least the polarizing plate and a liquid crystal cell.

The laminated optical film and the polarizing plate using the laminated optical film in the present invention can be advantageously used in liquid crystal display devices that have difficulty in displaying black and white without optical films, for example liquid crystal display devices of birefringent mode, particularly OCB liquid crystal display devices and ECB reflection-type liquid crystal display devices.

A transmissive liquid crystal display device includes a liquid crystal cell and two polarizing plates placed on both sides of the liquid crystal cell. The liquid crystal cell bears a liquid crystal between two electrode substrates.

As to the optical film, one optical film is placed between the liquid crystal cell and one of the polarizing plates; alternatively, two optical films are placed between the liquid crystal cell and both the polarizing plates.

A liquid crystal display device using a liquid crystal cell of OCB mode is a liquid crystal display device using a liquid crystal cell of bend alignment mode in which rod-like liquid crystal molecules in the upper part of the liquid crystal cell and those in the lower part of the liquid crystal cell are aligned in substantially opposite directions (symmetrically), as disclosed in the specifications of U.S. Pat. Nos. 4,583,825 and 5,410,422. Since the rod-like liquid crystal molecules in the upper part of the liquid crystal cell and those in the lower part of the liquid crystal cell are symmetrically aligned, the liquid crystal cell of bend alignment mode has self-optical compensatory function.

For that reason, this liquid crystal mode is also referred to as "OCB (optically compensatory bend) liquid crystal mode". Liquid crystal display devices of bend alignment mode are advantageous in terms of their high responsivity.

Also, the OCB liquid crystal mode makes high-speed response driving possible, and so it is preferably combined with a field sequential driving mode.

The Δnd value of the liquid crystal cell used in the liquid crystal display device of the present invention when no voltage is applied (when liquid crystal materials in the liquid crystal cell are aligned, with no voltage being applied to a liquid crystal layer) is preferably greater than or equal to 800 and less than 1,200.

EXAMPLES

The following explains Examples of the present invention; however, it should be noted that the present invention is not confined to these Examples in any way.

[Production of Optical Films 1 to 3]

Optical films 1 to 3 were produced by the production method shown below.

<Production of TAC A>

<<Preparation of Cellulose Acetate Solution A>>

The following composition was poured into a mixing tank, then stirred while being heated so as to dissolve its components, and a cellulose acetate solution A was thus prepared.

[Composition of Cellulose Acetate Solution A]

| | |
|---|---|
| Cellulose acetate having an acetification degree of 60.9% | 100 parts by mass |
| Triphenyl phosphate | 7.8 parts by mass |
| Biphenyldiphenyl phosphate | 3.9 parts by mass |
| Methylene chloride | 300 parts by mass |
| Methanol | 45 parts by mass |

Into another mixing tank, 4 parts by mass of cellulose acetate (linter) having an acetification degree of 60.9%, 25 parts by mass of the following retardation increasing agent, 0.5 parts by mass of fine silica particles (average particle size: 20 nm), 80 parts by mass of methylene chloride and 20 parts by mass of methanol were poured, then stirred while being heated, and a retardation increasing agent solution was thus prepared.

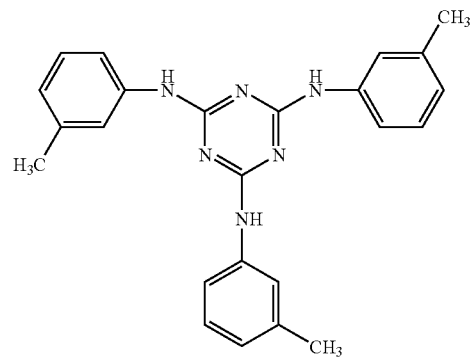

Retardation Increasing Agent

Into 470 parts by mass of the cellulose acetate solution A, 35 parts by mass of the retardation increasing agent solution was mixed, then the mixture was sufficiently stirred, and a dope was thus prepared. The mass ratio of the retardation increasing agent to the cellulose acetate was adjusted so as to obtain desired optical properties.

<Production of TAC B>

Into 470 parts by mass of the cellulose acetate solution A, 19 parts by mass of the retardation increasing agent solution was mixed, then the mixture was sufficiently stirred, and a dope was thus prepared. The mass ratio of the retardation increasing agent to the cellulose acetate was adjusted so as to obtain desired optical properties.

<Production of TAC C>

<<Preparation of Cellulose Acetate Solution C>>

The following cellulose acetate C was used. A cellulose acetate C was heated to 120° C. and thusly dried such that its moisture content percentage became 0.5% by mass or less, then 20 parts by mass of the cellulose acylate A was used.

1) Cellulose Acetate C

A powder of cellulose acetate having a substitution degree of 2.86 was used. As to the cellulose acetate C, the viscosity average polymerization degree was 300, the substitution degree of an acetyl group in the sixth position was 0.89, the amount of acetone extract was 7% by mass, the ratio of the mass average molecular weight to the number average molecular weight was 2.3, the moisture content percentage was 0.2% by mass, the viscosity in a 6% dichloromethane solution was 305 mPa·s, the amount of residual acetic acid was 0.1% by mass or less, the Ca content was 65 ppm, the Mg content was 26 ppm, the iron content was 0.8 ppm, the sulfuric acid ion content was 18 ppm, the yellow index was 1.9, and the amount of free acetic acid was 47 ppm. The powder had an average particle size of 1.5 mm, and the standard deviation thereof was 0.5 mm.

2) Solvent

The following solvent A was used. The moisture content percentage of the solvent was 0.2% by mass or less.

Solvent A

Dichloromethane/Methanol/Butanol=83 parts by mass/15 parts by mass/2 parts by mass 3) Additive The following additive A was used.

Additive A

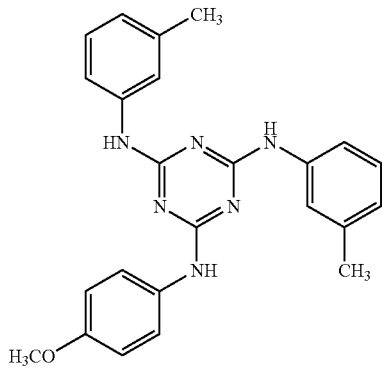

| Fine silicon dioxide particles (particle size: 20 nm, Mohs hardness: approximately 7) | (0.08 parts by mass) |
| Retardation increasing agent having the following structure | (0.8 parts by mass) |

4) Dissolution

Swelling and dissolution were carried out in accordance with the following dissolving step A.

Dissolving Step A

The solvent A and the additive A were poured into a 400-liter dissolving tank made of stainless steel, which had a stirring blade and around which cooling water was circulating; subsequently, while the solvent and the additive were being stirred and dispersed, the cellulose acetate was gradually added. After the cellulose acetate had been poured into the tank, the ingredients were stirred at room temperature for 2 hr and swollen for 3 hr, then the ingredients were stirred again, and a cellulose acetate solution was thus obtained.

For the stirring, a dissolver-type eccentric stirring shaft which performed stirring at a circumferential velocity of 15 m/sec (shearing stress: $5 \times 10^4$ kgf/m/sec$^2$ ($4.9 \times 10^5$ N/m/sec$^2$)), and a stirring shaft which had an anchor wing on a central shaft and performed stirring at a circumferential velocity of 1 m/sec (shearing stress: $1 \times 10^4$ kgf/m/sec$^2$ ($9.8 \times 10^4$ N/m/sec$^2$)) were used. As for the swelling, the higher-speed stirring shaft was stopped, and the circumferential velocity of the stirring shaft having the anchor wing was set at 0.5 m/sec.

The swollen solution was heated to 50° C. inside the tank, and further heated to 90° C. under a pressure of 2 MPa so as to dissolve the cellulose acylate completely. The time spent on the heating was 15 min. On that occasion, for a filter, a housing and the pipe, which were exposed to the high-temperature environment, the following were used: a filter, a housing and a pipe that were made of hastelloy alloy and superior in corrosion resistance and that had jackets to distribute heat media for heat retention and heating.

Next, the temperature was lowered to 36° C., and a cellulose acetate solution was thus obtained.

5) Filtration

The cellulose acetate solution obtained was filtered with filter paper (#63, produced by Toyo Roshi Kaisha, Ltd.) having an absolute filtration accuracy of 10 μm, and further filtered with a sintered metal filter (FH025, produced by Pall Corporation) having an absolute filtration accuracy of 2.5 μm, and a polymer solution was thus obtained.

(Production of Film)

The following film producing step A was employed.

Film Producing Step A

The polymer solution was heated to 30° C. and then cast onto a stainless steel specular support, which was a drum having a diameter of 3 m, via a casting geyser. The temperature of the support was set at −5° C., the casting speed was set at 100 m/min, and the coating width was set at 200 cm. The spatial temperature of the cast portion as a whole was set at 15° C. Then the cellulose acetate film which had been rolling over as it had been cast was removed from the drum at a point that was 50 cm away from the edge of the cast portion, and pin tenters were attached to both ends of the cellulose acetate film. The cellulose acetate film held by the pin tenters was conveyed to a drying zone. As initial drying, dry air having a temperature of 45° C. was blown onto the cellulose acetate film. Subsequently, it was dried at 110° C. for 5 min and further dried at 140° C. for 10 min, and a transparent film of cellulose acetate was thus obtained.

The cellulose acetate film produced as described above was then subjected to the following additional stretching step, heat-treating and stretching step A or B, and restretching step.

(Additional Stretching)

The cellulose acetate film obtained was subjected to the following additional stretching step A.

As to the method for measuring the additional draw ratio of the film, the film was marked with gauge lines at fixed intervals in the direction perpendicular to the conveyance direction of the film, the distance between the gauge lines was measured before and after a heat treatment, and the additional draw ratio was calculated from the following equation.

Additional draw ratio of film (%)=100 ×(Distance between gauge lines after heat treatment−Distance between gauge lines before heat treatment)/Distance between gauge lines before heat treatment Additional Stretching Step A The cellulose acetate film produced as described above was stretched using an apparatus in which a heating zone was provided between two nip rolls. The draw ratio was controlled by adjusting the circumferential velocity of the nip rolls, and the draw ratio was set at 1.2. The aspect ratio (distance between nip rolls/ base width) was adjusted to 3.3, the base temperature before the film entered the heating zone was set at 25° C., the temperature of the heating zone was set at 160° C., and the film was heated in the heating zone for 1 min.

(Heat Treatment and Stretching)

Heat-treating and Stretching Step A (Stretching in Traveling Direction)

The film obtained was stretched in the conveyance direction, using an apparatus in which a heating zone was provided between two nip rolls. The aspect ratio (distance between nip rolls/base width) was adjusted to 3.3, the base temperature before the film entered the heating zone was set at 25° C., and the temperature of the heating zone was set at 240° C. The film obtained had a length of 2,600 m and was wound in the form of a roll.

Heat-treating and Stretching Step B (Stretching in Width Direction)

Both ends of the film obtained were firmly held by tenter clips, then inside the heating zone the film was stretched in the direction perpendicular to the conveyance direction. The temperature of the heating zone was set at 240° C.

(Restretching)

Subsequently, both ends of the film having undergone the heat treatment were firmly held by tenter clips, then inside the heating zone the film was stretched in the direction perpendicular to the conveyance direction. The temperature of the heating zone was set at 160° C., and the draw ratio was set at 15%. As to the method for measuring the draw ratio of the film, the film was marked with gauge lines at fixed intervals in the direction parallel to the conveyance direction of the film, the distance between the gauge lines was measured before and after the stretching, and the draw ratio was calculated from the following equation.

Draw ratio of film (%)=100×(Distance between gauge lines after stretching−Distance between gauge lines before stretching)/Distance between gauge lines before stretching (Slow Phase Axis in Each Optical Film and Setting of Optical Property)

In the case where a slow phase axis was made to lie in the traveling direction of a roll (optical film in the form of a roll), the optical film was stretched in the traveling direction of the roll. The in-plane retardation values (Re1 and Re2) of the optical film were adjusted by appropriately setting the draw ratio.

In the case where the slow phase axis was made to lie in the width direction of the roll, the optical film was stretched in the width direction of the roll. Re1 and Re2 were adjusted by appropriately setting the draw ratio.

The draw ratio was adjusted to the range of approximately 1.00 to 1.40.

The retardation values (Rth1 and Rth2) of the optical film in its thickness direction were adjusted to desired values by using a material capable of exhibiting phase retardation in thickness direction, and adjusting the amount of the material added.

[Production of Optical Film A]

An optical film A (COCA) was obtained by stretching an ARTON (registered trademark) film (produced by JSR Corporation) so as to have desired optical properties.

Examples 1 to 5 and Comparative Examples 1 and 2

<Laminated Optical Film>

As to laminated optical films of Examples 1 to 5 and Comparative Examples 1 and 2, first and second optical anisotropic layers were selected such that the optical property values Re and Rth of the laminated optical films became 45 nm and 320 nm respectively. The following specifically explains these laminated optical films.

(When Slow Phase Axes are Perpendicular)

In each of Examples 1, 3 and 5 and Comparative Example 2, the first optical anisotropic layer and the second optical anisotropic layer were laid on top of each other in accordance with roll-to-roll processing, such that their slow phase axes were placed perpendicularly to each other.

As to each of these Examples and Comparative Example 2, the optical property values (initial property values, at a relative humidity of 50%) Re1 and Rth1 of the first optical anisotropic layer were 10 nm and 90 nm respectively, and the optical property values Re2 and Rth2 of the second optical anisotropic layer were 55 nm and 230 nm respectively.

(When Slow Phase Axes are Parallel)

In each of Examples 2 and 4 and Comparative Example 1, the first optical anisotropic layer and the second optical anisotropic layer were laid on top of each other in accordance with roll-to-roll processing, such that their slow phase axes were placed parallel to each other.

As to each of these Examples and Comparative Example 1, the optical property values (initial property values, at a relative humidity of 50%) Re1 and Rth1 of the first optical anisotropic layer were 10 nm and 90 nm respectively, and the optical property values Re2 and Rth2 of the second optical anisotropic layer were 35 nm and 230 nm respectively.

Laminated optical films were obtained by providing each of the laminated optical films of Examples 1 to 5 and Comparative Examples 1 and 2, which had the first and second optical anisotropic layers, with a third optical anisotropic layer in accordance with the following method.

(Saponifying Process)

An isopropyl alcohol solution of 1.5N potassium hydroxide was applied over the surface of each laminated optical film on the side of the second optical anisotropic layer at a rate of 25 ml/m² and then left to stand at 25° C. for 5 sec. Thereafter, the solution was washed with running water for 10 sec, and air having a temperature of 25° C. was blown so as to dry the surface of the film. In this way, only the surface of each laminated optical film on the side of the second optical anisotropic layer was saponified.

(Formation of Alignment Film)

An alignment film coating solution having the following composition was applied over one surface of each saponified laminated optical film at a rate of 24 ml/m², using a #14 wire bar coater. Thereafter, the alignment film coating solution was dried for 60 sec with warm air having a temperature of 60° C. and further dried for 150 sec with warm air having a temperature of 90° C., and a film was thus formed on the second optical anisotropic layer of each laminated optical film.

Subsequently, the film formed was subjected to a rubbing process in a direction that formed an angle of 45° with the slow phase axis of the second optical anisotropic layer, and an alignment film was thus formed.

[Composition of Alignment Film Coating Solution]

| The following modified polyvinyl alcohol | 10 parts by mass |
| Water | 371 parts by mass |
| Methanol | 119 parts by mass |
| Glutaraldehyde (Cross-linking agent) | 0.5 parts by mass |

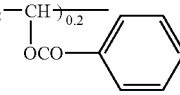

Modified polyvinyl alcohol (Third Optical Anisotropic Layer)

A coating solution was prepared by dissolving 91 parts by mass of the following discotic liquid crystal compound, 9 parts by mass of ethylene oxide-modified trimethylolpropane triacrylate (V#360, produced by Osaka Organic Chemical Industry Ltd.), 0.5 parts by mass of cellulose acetate butyrate (CAB531-1, produced by Eastman Chemical Company), 3 parts by mass of a photopolymerization initiator (IRGACURE 907, produced by Nihon Ciba-Geigy K. K.) and 1 part by mass of a sensitizer (KAYACURE DETX, produced by Nippon Kayaku Co., Ltd.) in 204.0 parts by mass of methyl ethyl ketone.

The coating solution was applied onto the alignment film at a rate of 5.52 ml/m², using a #3.2 wire bar. The alignment film with the coating solution was affixed to a metal frame and heated for 2 min in a constant-temperature bath having a temperature of 130° C. so as to align the discotic liquid crystal compound.

Next, the alignment film with the coating solution was irradiated with an ultraviolet ray at 90° C. for 4 min, using a 120 W/cm high-pressure mercury-vapor lamp, so as to polymerize the discotic liquid crystal compound. Thereafter, the alignment film with the coating solution was naturally cooled to room temperature. In this way, a third optical anisotropic layer was formed, and a laminated optical film was obtained. Details of each laminated optical film are shown together in Table 1.

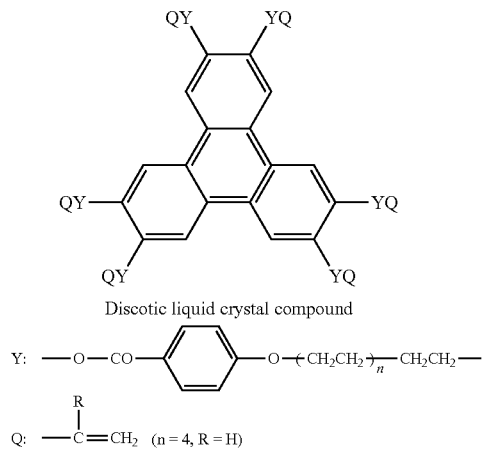

Discotic liquid crystal compound

Polarizing Plates for Examples 1 to 5 and Comparative Examples 1 and 2

A polarizer was formed on each laminated optical film in accordance with the following method so as to produce polarizing plates for Examples 1 to 5 and Comparative Examples 1 and 2.
(Production of Polarizer)
Iodine was absorbed into a stretched polyvinyl alcohol film so as to produce a polarizing film (polarizer).

Production of Polarizing Plates for Examples 1 to 5 and Comparative Examples 1 and 2

The polarizing film was affixed onto the side of the first optical anisotropic layer of each laminated optical film, using a polyvinyl alcohol-based adhesive.
Further, a commercially available cellulose triacetate film (FUJITAC TD80UF, produced by FUJIFILM Corporation) which had undergone a process similar to the saponifying process was affixed to the polarizing film, using a polyvinyl alcohol-based adhesive. In this way, polarizing plates for Examples 1 to 5 and Comparative Examples 1 and 2 were obtained.

Liquid Crystal Display Devices for Examples 1 to 5 and Comparative Examples 1 and 2

Liquid crystal display devices for Examples 1 to 5 and Comparative Examples 1 and 2 were produced using the polarizing plates.

Production of Bend Alignment Liquid Crystal Cells for Examples 1 to 5 and Comparative Examples 1 and 2

Two glass substrates each equipped with an ITO electrode were prepared. A polyimide film was provided as an alignment film on the two glass substrates, and the alignment film was subjected to a rubbing process. The two glass substrates were made to face each other such that their rubbing directions were parallel to each other, and the thickness of a liquid crystal cell was set at 7.2 μm. A liquid crystal compound (ZLI1132, produced by Merck Ltd.) whose $\Delta n$ was 0.1396 was injected into the liquid crystal cell gap. In this way, liquid crystal cells with bend alignment for Examples 1 to 5 and Comparative Examples 1 and 2 were produced.

Production of Liquid Crystal Display Devices for Examples 1 to 5 and Comparative Examples 1 and 2

A liquid crystal display device was produced by combining the liquid crystal cell with a pair of the polarizing plates.
As to the placement of the liquid crystal cell and the pair of the polarizing plates, the third optical anisotropic layers of the polarizing plates faced the substrates of the liquid crystal cell, and the rubbing direction of the liquid crystal cell and the rubbing direction of the third optical anisotropic layers that faced each other were made antiparallel to each other.
The polarizing plates were affixed onto the visible side and the back light side of different transparent substrates between which the liquid crystal cell produced was sandwiched.
The third optical anisotropic layers of the polarizing plates were placed facing the transparent substrates, the rubbing direction of the liquid crystal cell and the rubbing direction of the third optical anisotropic layers that were opposed to each other were made antiparallel to each other, and a liquid crystal display device whose liquid crystal cell was 20 inch in size was thus produced. In this way, liquid crystal display devices for Examples 1 to 5 and Comparative Examples 1 and 2 were produced.

<Evaluation of Liquid Crystal Display Devices (Evaluation of Viewing Angles)>The viewing angles of the liquid crystal display devices of Examples 1 to 5 and Comparative Examples 1 and 2 were evaluated in accordance with the following method.

Each liquid crystal display device produced was placed on back light at a temperature of 25° C. and a relative humidity of 50%, and voltage was applied to the bend alignment liquid crystal cell by means of a 55 Hz rectangular wave.

While the voltage was being adjusted, the voltage at which the black luminance (front luminance) was the smallest was measured using a luminance meter (BM-5, manufactured by Topcon Corporation).

Next, the black luminance and the white luminance (front luminance) at the center of the screen were measured in a similar manner using the luminance meter, and the contrast viewing angle of each liquid crystal display device was measured.

Subsequently, the contrast viewing angle of each liquid crystal display device was measured in a similar manner at a temperature of 25° C. and a relative humidity of 80%.

Whether or not the viewing angles changed because of the change in humidity was judged. The results are shown in Table 2. In Table 2, A means that the viewing angle did not change at all, B means that the viewing angle almost did not change, and C means that the viewing angle changed.

TABLE 1

| | Optical anisotropic layer | Film | Slow phase axis direction (Roll) | Placement of slow phase axes | Re/Rth (50% RH × 25° C.) | ΔRe1 | ΔRe2 | ΔRth1 | ΔRth2 |
|---|---|---|---|---|---|---|---|---|---|
| Ex 1 | First | 1(TAC A) | Traveling direction | Perpendicular | 10/90 | 5 | — | 12 | — |
| | Second | 2(TAC B) | Width direction | | 55/230 | — | 7 | — | 18 |
| Comp Ex 1 | First | 1(TAC A) | Width direction | Parallel | 10/90 | 5 | — | 12 | — |
| | Second | 2(TAC B) | Width direction | | 55/230 | — | 7 | — | 18 |
| Ex 2 | First | 1(TAC A) | Width direction | Parallel | 10/90 | 5 | — | 12 | — |
| | Second | A(COC A) | Width direction | | 55/230 | — | 0 | — | 0 |
| Ex 3 | First | 1(TAC A) | Traveling direction | Perpendicular | 10/90 | 5 | — | 12 | — |
| | Second | A(COC A) | Width direction | | 55/230 | — | 0 | — | 0 |
| Ex 4 | First | 3(TAC C) | Width direction | Parallel | 10/90 | −3 | — | 10 | — |
| | Second | 2(TAC B) | Width direction | | 55/230 | — | 7 | — | 18 |
| Comp Ex 2 | First | 3(TAC C) | Traveling direction | Perpendicular | 10/90 | −3 | — | 10 | — |
| | Second | 2(TAC B) | Width direction | | 55/230 | — | 7 | — | 18 |
| Ex 5 | First | 3(TAC C) | Width direction | Parallel | 10/90 | −6 | — | 10 | — |
| | Second | A(COC A) | Width direction | | 55/230 | — | 8 | — | 0 |

TABLE 2

| | \|ΔRe1 − ΔRe2\| | \|ΔRe1 + ΔRe2\| | \|ΔRth1 + ΔRth2\| | Change in viewing angle (50% RH→80% RH) |
|---|---|---|---|---|
| Ex 1 | 2 | — | 30 | B |
| Comp Ex 1 | — | 12 | 30 | C |
| Ex 2 | — | 5 | 12 | B |
| Ex 3 | 5 | — | 12 | B |
| Ex 4 | — | 4 | 28 | B |
| Comp Ex 2 | 12 | — | 28 | C |
| Ex 5 | — | 2 | 10 | A |

Judging from the results in Tables 1 and 2, the following were found. Examples 1 and 3 are cases where the slow phase axes of the optical anisotropic layers are placed perpendicularly (vertically) to each other, and Relationship (1) above is satisfied. As to these Examples, it was found that even when the relative humidity changed from 50% to 80%, change in viewing angle was reduced.

Meanwhile, Comparative Example 2 is a case where the slow phase axes of the optical anisotropic layers are placed perpendicularly (vertically) to each other, and Relationship (1) above is not satisfied. As to this Comparative Example, it was found that when the relative humidity changed, the viewing angle changed.

Examples 2, 4 and 5 are cases where the slow phase axes of the optical anisotropic layers are placed parallel to each other, and Relationship (2) above is satisfied. As to these Examples, it was found that even when the relative humidity changed from 50% to 80%, change in viewing angle was reduced.

Meanwhile, Comparative Example 1 is a case where the slow phase axes of the optical anisotropic layers are placed parallel to each other, and Relationship (2) above is not satisfied. As to this Comparative Example, it was found that when the relative humidity changed, the viewing angle changed.

It should be noted that as to Example 5 in particular, when Relationship (2) above is satisfied, Relationship (3) above is also satisfied. In other words, as to the laminated optical film of Example 5, it was found that even when the relative humidity changed from 50% to 80%, the retardation value Rth in the thickness direction was reduced, and change in viewing angle was reduced most.

What is claimed is:

1. A laminated optical film comprising:
a first optical anisotropic layer, and
a second optical anisotropic layer,
wherein Relationship (1) is satisfied when a slow phase axis of the first optical anisotropic layer is substantially perpendicular to a slow phase axis of the second optical anisotropic layer, $$-10 \text{ nm} \leq \Delta Re1 - \Delta Re2 \leq 10 \text{ nm} \qquad \text{Relationship (1)}$$

wherein Relationship (2) is satisfied when the slow phase axis of the first optical anisotropic layer is substantially parallel to the slow phase axis of the second optical anisotropic layer, and $$-10 \text{ nm} \leq \Delta Re1 + \Delta Re2 \leq 10 \text{ nm} \qquad \text{Relationship (2)}$$

wherein an in-plane retardation value Re of the laminated optical film as a whole satisfies 30 nm≦Re≦500 nm,
where ΔRe1 denotes a value obtained by calculating the expression Re1 (at a relative humidity of 80%)−Re1 (at a relative humidity of 50%) concerning the first optical anisotropic layer, and ΔRe2 denotes a value obtained by calculating the expression Re2 (at a relative humidity of 80%)−Re2 (at a relative humidity of 50%) concerning the second optical anisotropic layer.

2. The laminated optical film according to claim 1, wherein Rth1 of the first optical anisotropic layer, and Rth2 of the second optical anisotropic layer satisfy one of Relationships (3) and (4), and $$\Delta Rth1 \geq 0 \text{ nm and } \Delta Rth2 \leq 0 \text{ nm} \qquad (3)$$

$$\Delta Rth1 < 0 \text{ nm and } \Delta Rth2 > 0 \text{ nm} \qquad (4)$$

wherein a retardation value Rth of the laminated optical film as a whole in its thickness direction satisfies 50 nm≦Rth≦500 nm,
where ΔRth1 denotes a value obtained by calculating the expression Rth1 (at a relative humidity of 80%)−Rth1 (at a relative humidity of 50%) concerning the first optical anisotropic layer, and ΔRth2 denotes a value obtained by calculating the expression Rth2 (at a relative humidity of 80%)−Rth2 (at a relative humidity of 50%) concerning the second optical anisotropic layer.

3. The laminated optical film according to claim 1, wherein the first optical anisotropic layer and the second optical anisotropic layer are stuck together by roll-to-roll processing when both of them are in the form of rolls.

4. The laminated optical film according to claim 1, further comprising a third optical anisotropic layer, wherein the third optical anisotropic layer is formed of a hybrid aligned discotic liquid crystal layer.

5. The laminated optical film according to claim 4, wherein when the third optical anisotropic layer is formed, a rubbing direction is angled by 40° to 50° with respect to the slow phase axis of the first optical anisotropic layer and the slow phase axis of the second optical anisotropic layer.

6. A polarizing plate comprising:
a laminated optical film, and
a polarizer,
wherein the laminated optical film comprises a first optical anisotropic layer and a second optical anisotropic layer,
wherein Relationship (1) is satisfied when a slow phase axis of the first optical anisotropic layer is substantially perpendicular to a slow phase axis of the second optical anisotropic layer, $-10 \text{ nm} \leq \Delta Re1 - \Delta Re2 \leq 10 \text{ nm}$    Relationship (1)

wherein Relationship (2) is satisfied when the slow phase axis of the first optical anisotropic layer is substantially parallel to the slow phase axis of the second optical anisotropic layer, and $-10 \text{ nm} \leq \Delta Re1 + \Delta Re2 \leq 10 \text{ nm}$    Relationship (2)

wherein an in-plane retardation value Re of the laminated optical film as a whole satisfies $30 \text{ nm} \leq Re \leq 500 \text{ nm}$,
where $\Delta Re1$ denotes a value obtained by calculating the expression Re1 (at a relative humidity of 80%)−Re1 (at a relative humidity of 50%) concerning the first optical anisotropic layer, and $\Delta Re2$ denotes a value obtained by calculating the expression Re2 (at a relative humidity of 80%)−Re2 (at a relative humidity of 50%) concerning the second optical anisotropic layer.

7. A liquid crystal display device comprising:
a polarizing plate which comprises a laminated optical film and a polarizer, and
a liquid crystal cell,
wherein the laminated optical film comprises a first optical anisotropic layer and a second optical anisotropic layer,
wherein Relationship (1) is satisfied when a slow phase axis of the first optical anisotropic layer is substantially perpendicular to a slow phase axis of the second optical anisotropic layer, $-10 \text{ nm} \leq \Delta Re1 - \Delta Re2 \leq 10 \text{ nm}$    Relationship (1)

wherein Relationship (2) is satisfied when the slow phase axis of the first optical anisotropic layer is substantially parallel to the slow phase axis of the second optical anisotropic layer, and $-10 \text{ nm} \leq \Delta Re1 + \Delta Re2 \leq 10 \text{ nm}$    Relationship (2)

wherein an in-plane retardation value Re of the laminated optical film as a whole satisfies $30 \text{ nm} \leq Re \leq 500 \text{ nm}$,
where $\Delta Re1$ denotes a value obtained by calculating the expression Re1 (at a relative humidity of 80%)−Re1 (at a relative humidity of 50%) concerning the first optical anisotropic layer, and $\Delta Re2$ denotes a value obtained by calculating the expression Re2 (at a relative humidity of 80%)−Re2 (at a relative humidity of 50%) concerning the second optical anisotropic layer.

8. The liquid crystal display device according to claim 7, wherein the liquid crystal cell is a liquid crystal cell of OCB mode.

* * * * *